United States Patent
Hashimoto et al.

(10) Patent No.: US 11,283,082 B2
(45) Date of Patent: Mar. 22, 2022

(54) GAS DIFFUSION ELECTRODE AND PRODUCTION METHOD THEREFOR

(71) Applicant: Toray Industries, Inc., Tokyo (JP)

(72) Inventors: Masaru Hashimoto, Otsu (JP); Michio Wakatabe, Otsu (JP); Sho Kato, Otsu (JP)

(73) Assignee: Toray Industries, Inc., Tokyo (JP)

(*) Notice: Subject to any disclaimer, the term of this patent is extended or adjusted under 35 U.S.C. 154(b) by 73 days.

(21) Appl. No.: 16/462,321

(22) PCT Filed: Nov. 9, 2017

(86) PCT No.: PCT/JP2017/040443
§ 371 (c)(1),
(2) Date: May 20, 2019

(87) PCT Pub. No.: WO2018/105301
PCT Pub. Date: Jun. 14, 2018

(65) Prior Publication Data
US 2019/0372129 A1    Dec. 5, 2019

(30) Foreign Application Priority Data
Dec. 5, 2016    (JP) .............................. JP2016-235647

(51) Int. Cl.
*H01M 4/88* (2006.01)
*H01M 4/86* (2006.01)
*H01M 8/10* (2016.01)

(52) U.S. Cl.
CPC ....... *H01M 4/8807* (2013.01); *H01M 4/8605* (2013.01); *H01M 2008/1095* (2013.01)

(58) Field of Classification Search
CPC ............. H01M 4/8807; H01M 4/8605; H01M 2008/1095
See application file for complete search history.

(56) References Cited

U.S. PATENT DOCUMENTS

| 9,466,851 B2 | 10/2016 | Tsubosaka |
| 2017/0012291 A1 | 1/2017 | Tanimura et al. |

(Continued)

FOREIGN PATENT DOCUMENTS

| JP | 2006228514 A | 8/2006 |
| JP | 2008269929 A | 11/2008 |

(Continued)

OTHER PUBLICATIONS

International Search Report and Written Opinion for International Application No. PCT/JP2017/040443, dated Jan. 30, 2018—5 pages.

*Primary Examiner* — Milton I Cano
*Assistant Examiner* — Jenna Shulman
(74) *Attorney, Agent, or Firm* — RatnerPrestia

(57) ABSTRACT

The present invention provides a gas diffusion electrode including a microporous layer, characterized in that the microporous layer includes at least a first microporous layer and a second microporous layer, wherein the first microporous layer contains a first hydrophobic polymer and is located on the outermost surface on one side of the microporous layer; wherein the second microporous layer contains a second hydrophobic polymer and is located on the outermost surface of the microporous layer on the side opposite to the first microporous layer, and is located on an outermost surface of the gas diffusion electrode; and wherein the first hydrophobic polymer is a resin having a melting point lower than the melting point of the second hydrophobic polymer. The present invention provides a gas diffusion electrode for a fuel cell, in which both high performance and durability are achieved.

6 Claims, 2 Drawing Sheets

(56) References Cited

U.S. PATENT DOCUMENTS

| | | | |
|---|---|---|---|
| 2018/0219228 A1* | 8/2018 | Hashimoto | H01M 8/0243 |
| 2019/0006682 A1* | 1/2019 | Okano | H01M 4/8605 |

FOREIGN PATENT DOCUMENTS

| | | | |
|---|---|---|---|
| JP | 2010049933 A | 3/2010 | |
| JP | 5862485 B2 | 2/2016 | |
| WO | 2015125748 A1 | 8/2015 | |

* cited by examiner

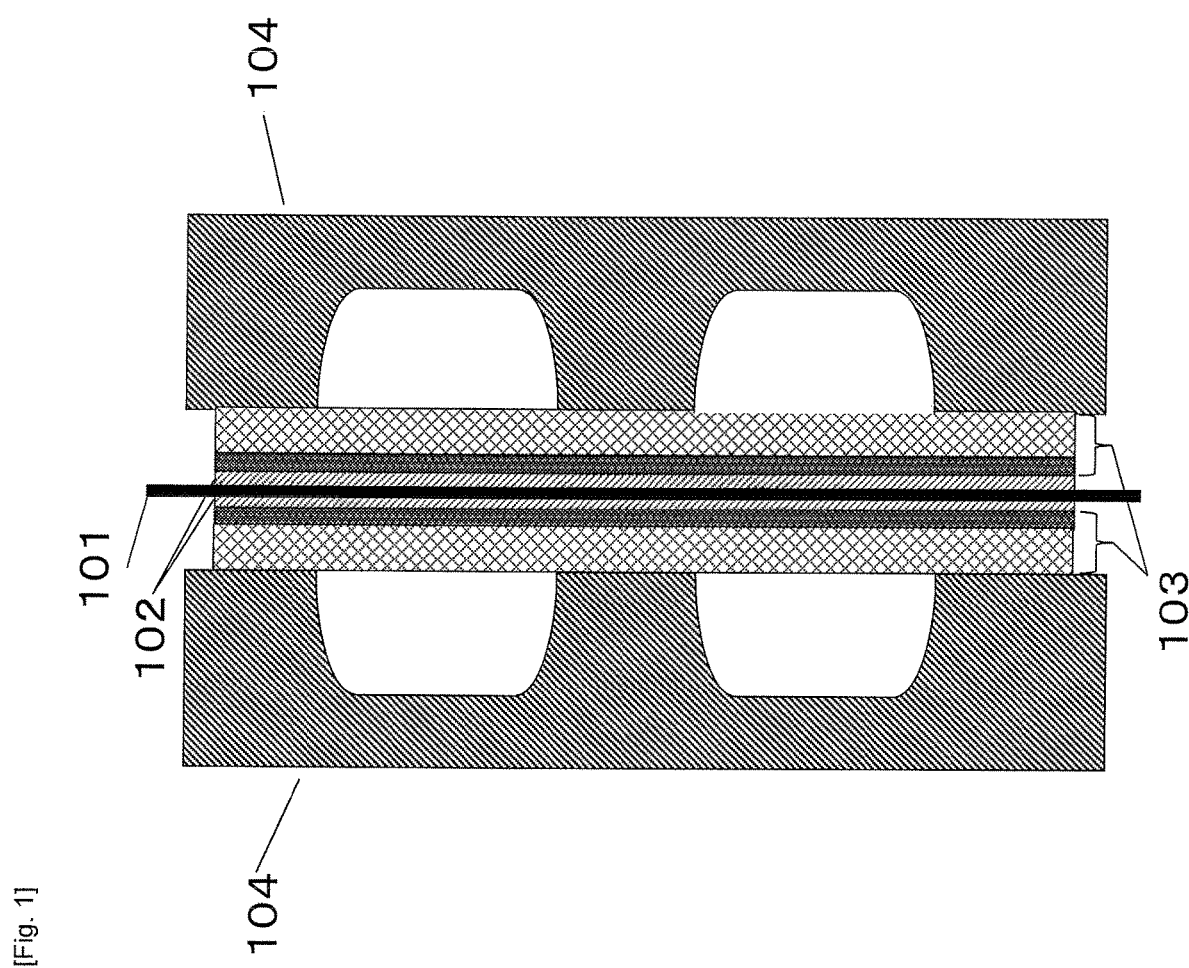
[Fig. 1]

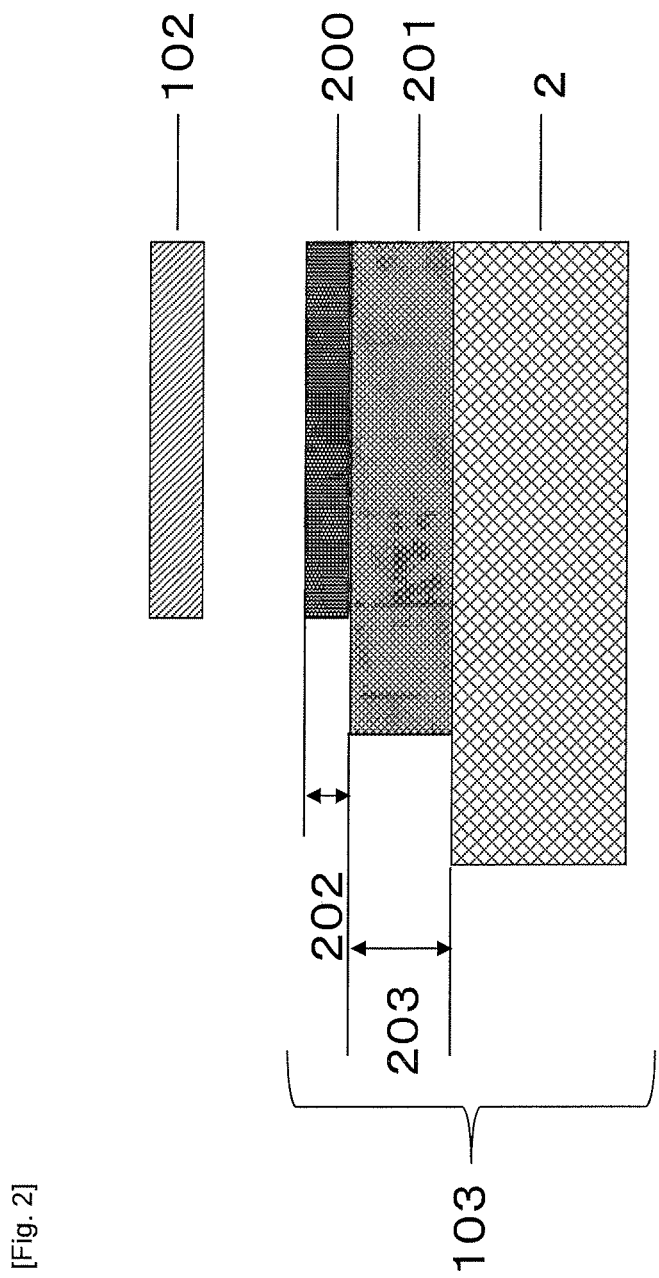

GAS DIFFUSION ELECTRODE AND PRODUCTION METHOD THEREFOR

CROSS REFERENCE TO RELATED APPLICATIONS

This is the U.S. National Phase application of International Application No. PCT/JP2017/040443, filed Nov. 9, 2017, which claims priority to Japanese Patent Application No. 2016-235647, filed Dec. 5, 2016, the disclosures of these applications being incorporated herein by reference in their entireties for all purposes.

FIELD OF THE INVENTION

Fuel cells utilize a mechanism to electrically extract the energy generated when hydrogen is allowed to react with oxygen to produce water, and are expected to gain popularity as clean energy, because of their high energy efficiency and of the fact that they discharge only water as effluent. The present invention relates to a gas diffusion electrode for use in a fuel cell. More particularly, the present invention relates to a gas diffusion electrode for use in a polymer electrolyte fuel cell, among various types of fuel cells, which cell is used as a power supply for a fuel cell vehicle or the like.

BACKGROUND OF THE INVENTION

Electrodes used in a polymer electrolyte fuel cell are disposed, as shown in FIG. 1, between two bipolar plates 104 in a single cell of the polymer electrolyte fuel cell, and the single cell has a structure composed of: a polymer electrolyte membrane 101; catalyst layers 102 formed on both surfaces of the polymer electrolyte membrane; and gas diffusion electrode 103 formed on the outer surfaces of the catalyst layers.

Gas diffusion electrodes are commercially distributed as separate members for forming gas diffusion layers in electrodes. These gas diffusion electrodes are required to have performances, such as, for example, gas diffusivity, electrical conductivity for collecting electricity generated in the catalyst layers, and water removal performance for efficiently removing water generated on the surfaces of the catalyst layers. To obtain such a gas diffusion electrode, a conductive porous substrate having both the gas diffusivity and electrical conductivity is generally used.

Specifically, a material composed of carbon fibers, such as a carbon felt, a carbon paper or a carbon cloth is used as the conductive porous substrate. In particular, a carbon paper is considered to be most preferred from the viewpoint of mechanical strength.

Since a fuel cell is a system for electrically extracting the energy generated when hydrogen is allowed to react with oxygen to produce water, an increase in electrical load, namely, an increase in the current to be extracted outside the cell results in the generation of a large amount of water (water vapor). The thus formed water vapor is condensed and forms water droplets at a low temperature. When the water droplets clog the pores of the gas diffusion electrodes, the feed rate of gas (oxygen or hydrogen) to the catalyst layers is decreased, and it eventually results in the termination of power generation when all the pores are clogged (this phenomenon is referred to as "flooding").

In order to prevent the "flooding" from occurring, as much as possible, gas diffusion electrodes are required to have water removal performance. As a means for enhancing the water removal performance, a conductive porous substrate to be used for a gas diffusion electrode is usually subjected to a hydrophobic treatment for enhancing hydrophobicity.

In cases where the hydrophobically treated conductive porous substrate as described above is used as a gas diffusion electrode, as it is, large water droplets are formed when water vapor is condensed, due to the coarse fibrous surface of the conductive porous substrate, making the flooding more likely to occur. Therefore, there are cases where a layer referred to as a microporous layer is formed on the hydrophobically treated conductive porous substrate. Such a microporous layer is formed by preparing an ink in which electrically conductive fine particles, such as carbon black, and a hydrophobic polymer are dispersed, and coating the ink on the conductive porous substrate, followed by drying and sintering. The roles of the microporous layer are, in addition to the above: preventing a catalyst layer from penetrating into the conductive porous substrate having a coarse surface; reducing the contact resistance with the catalyst layer; and preventing physical damage to an electrolyte membrane which occurs as a result of the coarse surface of the conductive porous substrate being transferred to the electrolyte membrane.

In addition, there are cases where the catalyst layer and the microporous layer are crimped so as to be adhered with each other, in order to further reduce the contact resistance with the catalyst layer, and to allow the gas diffusion electrode to conform to the thickness change due to swelling of the electrolyte membrane which occurs during the power generation of a fuel cell, thereby achieving both high performance and durability. In this case, it is desired that the catalyst layer and electrically conductive fine particles in the microporous layer have a large contact area.

On the other hand, in order to prevent the occurrence of flooding, which is one of the purposes for providing the microporous layer, the microporous layer needs to have hydrophobicity.

PATENT DOCUMENTS

Prior art techniques for improving the adhesion between a catalyst layer and a microporous layer are disclosed, for example, in Patent Documents 1 and 2.

Patent Document 1 JP 2010-049933 A Patent Document 2 JP 5862485 B

SUMMARY OF THE INVENTION

Patent Document 1 discloses a technique in which an adhesive powder is sprayed on one surface of either a catalyst layer or a microporous layer, followed by thermo-compression bonding to soften the adhesive powder, in order to improve the adhesion strength between the catalyst layer and the microporous layer. However, the use of the adhesive powder results in the occurrence of problems such as an increase in contact resistance, interference with removal of water, and a decrease in gas diffusivity, as compared to a case in which the adhesive powder is not used.

Patent Document 2 discloses a technique in which the side of a microporous layer which is in contact with a conductive porous substrate is sintered at a temperature higher than the melting point of a hydrophobic polymer, and the side of the microporous layer which is in contact with a catalyst layer is sintered at a temperature lower than the melting point of the hydrophobic polymer, so as to achieve both an improvement in the adhesion between the catalyst layer and the microporous layer, and an improvement in performance by preventing the occurrence of flooding. Specifically, Patent Document 2 proposes: a method in which both sides of a gas diffusion electrode are maintained at different temperatures during sintering; and a method in which the formation of the microporous layer is divided in a plurality of steps, and sintering is carried out at a different temperature after each formation step. However, in the former method, the temperature control during the sintering is difficult; and the latter method results in an increased cost due to increased formation steps.

The gas diffusion electrode according to the present invention has the following constitution, in order to solve the above mentioned problems.

That is, the present invention provides:

a gas diffusion electrode including a microporous layer, wherein the microporous layer includes at least a first microporous layer and a second microporous layer;

wherein the first microporous layer contains a hydrophobic polymer 1, and is located on the outermost surface on one side of the microporous layer;

wherein the second microporous layer contains a hydrophobic polymer 2, and is located on the outermost surface of the microporous layer on the side opposite to the first microporous layer, and is located on an outermost surface of the gas diffusion electrode; and wherein the hydrophobic polymer 1 is a resin having a melting point lower than the melting point of the hydrophobic polymer 2.

In the gas diffusion electrode according to the present invention, the hydrophobic polymer 1 preferably has a melting point of 200° C. or more and 250° C. or less, and the hydrophobic polymer 2 preferably has a melting point of 330° C. or more and 400° C. or less.

In the gas diffusion electrode according to the present invention, the hydrophobic polymer 1 is preferably a tetrafluoroethylene-hexafluoropropylene copolymer (hereinafter, referred to as FEP), and the hydrophobic polymer 2 is preferably a polytetrafluoroethylene resin (hereinafter, referred to as PTFE).

In the gas diffusion electrode according to the present invention, the first microporous layer preferably has a thickness of 9.9 μm or more and 50 μm or less.

In the gas diffusion electrode according to the present invention, the second microporous layer preferably has a thickness of 0.1 μm or more and 10 μm or less.

The gas diffusion electrode according to the present invention preferably includes: a conductive porous substrate; and the first microporous layer provided at least on one surface of the conductive porous substrate.

Further, of the methods of producing the gas diffusion electrode according to the present invention, the method of producing a gas diffusion electrode according to one embodiment which does not include a conductive porous substrate has the following constitution. That is, the present invention provides:

a method of producing the above described gas diffusion electrode, the method including, in the order mentioned below:

a step 1 of coating an ink 1 containing the hydrophobic polymer 1 on one surface of a film;

a step 2 of coating an ink 2 containing the hydrophobic polymer 2 on the side of the film on which the ink 1 was coated;

a step 3 of sintering the resultant at a temperature higher than the melting point of the hydrophobic polymer 1 and lower than the melting point of the hydrophobic polymer 2; and a step 4 of peeling off the microporous layer from the film.

Of the methods of producing the gas diffusion electrode according to the present invention, the method of producing a gas diffusion electrode according to another embodiment which includes a conductive porous substrate has the following constitution. That is, the present invention provides:

a method of producing the above described gas diffusion electrode, the method including, in the order mentioned below:

a step 1 of coating an ink 1 containing the hydrophobic polymer 1 on one surface of a conductive porous substrate;

a step 2 of coating an ink 2 containing the hydrophobic polymer 2 on the side of the conductive porous substrate on which the ink 1 was coated; and a step 3 of sintering the resultant at a temperature higher than the melting point of the hydrophobic polymer 1 and lower than the melting point of the hydrophobic polymer 2.

The present invention enables to provide a gas diffusion electrode including a microporous layer which exhibits a high adhesion to a catalyst layer while ensuring a high water removal performance and a high electrical conductivity. The above described gas diffusion electrode is capable of achieving both high performance and durability in a balanced manner.

BRIEF DESCRIPTION OF THE DRAWINGS

FIG. 1 is a cross-section diagram showing one cell (single cell) of a solid polymer fuel cell according to an embodiment of the present invention.

FIG. 2 is a schematic diagram showing the configuration of a gas diffusion electrode according to the present invention.

DETAILED DESCRIPTION OF THE INVENTION

The gas diffusion electrode according to the present invention is characterized in that it is a gas diffusion electrode including a microporous layer, wherein the microporous layer includes at least a first microporous layer and a second microporous layer;

wherein the first microporous layer contains a hydrophobic polymer 1, and is located on the outermost surface on one side of the microporous layer;

wherein the second microporous layer contains a hydrophobic polymer 2, and is located on the outermost surface of the microporous layer on the side opposite to the first microporous layer, and is located on an outermost surface of the gas diffusion electrode; and wherein the hydrophobic polymer 1 is a resin having a melting point lower than the melting point of the hydrophobic polymer 2.

A description will be given, first, regarding a conductive porous substrate which can be included in the gas diffusion electrode according to the present invention as described above.

In a solid polymer fuel cell, gas diffusion electrodes are required to have a high gas diffusivity for diffusing the gas supplied from bipolar plates to catalyst layers; a high water removal performance for removing water generated by an electrochemical reaction to the bipolar plates; and a high electrical conductivity for extracting the generated current.

Accordingly, in a gas diffusion electrode, it is preferred to use a conductive porous substrate which has an electrical conductivity and which is composed of a porous material usually having a pore size within the range of 10 μm or more and 100 μm or less. Further, in the embodiment of the gas diffusion electrode according to the present invention which includes a conductive porous substrate, it is preferred that the gas diffusion electrode include a conductive porous substrate; and the first microporous layer provided at least on one surface of the conductive porous substrate.

Specifically, it is preferred to use, as the conductive porous substrate, a porous substrate containing carbon fibers, such as a carbon fiber woven fabric, a carbon fiber papermaking substrate, a carbon fiber non-woven fabric, a carbon felt, a carbon paper or a carbon cloth; or a metal porous substrate, such as a sinterfoamed metal substrate, a metal mesh substrate or an expanded metal substrate. In particular, it is preferred to use a conductive porous substrate containing carbon fibers, such as a carbon felt, a carbon paper or a carbon cloth, because of its excellent corrosion resistance. Further, it is preferred to use a substrate composed of a carbon fiber papermaking substrate bonded with a carbide, namely, a carbon paper, because of its excellent ability to absorb the change in the size of an electrolyte membrane in the thickness direction, namely, excellent spring property.

In the present invention, a conductive porous substrate which has been hydrophobically treated by applying thereto a hydrophobic polymer is suitably used. The "hydrophobic polymer" as used herein refers to a polymer having a high contact angle with water, namely, a polymer in which the contact angle formed between the surface of the polymer and the surface of a water droplet is as large as 90 degrees or more. Examples of such a hydrophobic polymer include fluorine resins and silicon resins. Examples of the hydrophobic polymer to be applied to the conductive porous substrate include: PTFE (polytetrafluoroethylene resins) (such as "Teflon" (registered trademark)), FEP (tetrafluoroethylene-hexafluoropropylene copolymers), PFA (perfluoroalkoxy fluorine resins), ETFA (ethylene-tetrafluoroethylene copolymers), PVDF (polyvinylidene fluorides), and PVF (polyvinyl fluorides). Among these, PTFE or FEP is preferred because of its particularly high hydrophobicity.

The amount of the hydrophobic polymer in the conductive porous substrate is suitably about 0.1% by mass or more and 20% by mass or less with respect to 100% by mass of the total amount of the conductive porous substrate, but not particularly limited thereto. When the amount of the hydrophobic polymer is adjusted within the above described preferred range, the conductive porous substrate will exhibit a sufficient hydrophobicity. At the same time, there is no risk of clogging the pores of the substrate, which serve as gas diffusion paths or water removal paths, or of causing an increase in electrical resistance.

The hydrophobic treatment of the conductive porous substrate can be carried out by a treatment technique of dipping the conductive porous substrate in a dispersion containing a commonly known hydrophobic polymer; or by a technique of coating the conductive porous substrate with a hydrophobic polymer by die coating, spray coating, or the like. Further, the conductive porous substrate can also be treated by a dry process, such as sputtering of a hydrophobic polymer. If necessary, the hydrophobic treatment may be followed by a drying process, and further by a sintering process.

Next, a description will be given regarding the microporous layer. The gas diffusion electrode according to the present invention includes a microporous layer. The microporous layer includes at least the first microporous layer and the second microporous layer. Further, the gas diffusion electrode according to the present invention may be a gas diffusion electrode consisting of the microporous layer. As described above, in a suitable embodiment, the gas diffusion electrode according to the present invention includes the microporous layer at least on one surface of a conductive porous substrate, and includes the first microporous layer at least on one surface of the conductive porous substrate.

The microporous layer is not particularly limited as long as it includes at least the first microporous layer and the second microporous layer, namely, as long as the microporous layer includes two or more layers. The first microporous layer is located on the outermost surface on one side of the microporous layer. Further, the second microporous layer is located on the outermost surface of the microporous layer on the side opposite to the first microporous layer, and is located on an outermost surface of the gas diffusion electrode. Particularly preferred is an embodiment in which the microporous layer has a two-layer configuration, wherein the first microporous layer is provided so as to be in contact with at least one surface of the conductive porous substrate, and the second microporous layer is provided so as to be in contact with the first microporous layer.

The roles of the microporous layer are to provide effects, such as, for example: (1) preventing the condensation of water vapor generated at the cathode; (2) preventing a catalyst layer from penetrating into the conductive porous substrate having a coarse surface; (3) reducing the contact resistance with the catalyst layer; and (4) preventing physical damage to an electrolyte membrane which occurs as a result of the coarse surface of the conductive porous substrate being transferred to the electrolyte membrane.

First, the first microporous layer will be described. The first microporous layer is a layer having a plurality of pores, which is located on the outermost surface on one side of the microporous layer, and, in the gas diffusion electrode including a conductive porous substrate, the first microporous layer is in contact with the conductive porous substrate.

The first microporous layer preferably contains electrically conductive fine particles. Examples of the electrically conductive fine particles to be contained in the first microporous layer include: particles of metals such as gold, silver, copper, platinum and titanium; carbon black, which is a particulate electrically conductive material; vapor grown carbon fibers (VGCF), which are an electrically conductive material having a linear portion; linear carbons such as carbon nanotubes, carbon nanohorns, carbon nanocoils, cup-stacked carbon nanotubes, bamboo-like carbon nanotubes, graphite nanofibers and chopped carbon fibers; titanium oxide and zinc oxide; and graphene and graphite, which are scaly electrically conductive materials. Among these, a particulate electrically conductive material or an electrically conductive material having a linear portion is preferred as the electrically conductive fine particles.

Further, the first microporous layer contains the hydrophobic polymer 1, because the first microporous layer is required to have properties such as electrical conductivity, gas diffusivity, water removal performance, moisture retention, thermal conductivity, and/or the like, as well as resistance to strong acids on the anode side and oxidation resistance on the cathode side in the interior of a fuel cell. Examples of hydrophobic polymers to be contained in the first microporous layer and the second microporous layer include PTFE, FEP, PFA and ETFA, which are the same as the hydrophobic polymers suitably used for imparting hydrophobicity to the conductive porous substrate.

When the microporous layer is subjected to a sintering process to be described later, the hydrophobic polymer contained therein melts and sufficiently covers the surfaces of the electrically conductive fine particles, thereby providing a high hydrophobicity. The hydrophobic polymer 1 to be contained in the first microporous layer is required to be of a type capable of sufficiently melting even when sintered at a low temperature. Accordingly, a hydrophobic polymer having a melting point of 200° C. or more and 250° C. or less is suitably used as the hydrophobia polymer 1. FEP is suitably used as such a material.

Next, the second microporous layer will be described. The second microporous layer is a layer having a plurality of pores, which is located on the outermost surface of the microporous layer on the side opposite to the first microporous layer, and is located on an outermost surface of the gas diffusion electrode. In the embodiment of the gas diffusion electrode which includes a conductive porous substrate, the second microporous layer is present, when seen from the side of the conductive porous substrate, on the outer side of the first microporous layer in the gas diffusion electrode.

The second microporous layer preferably contains electrically conductive fine particles. The electrically conductive fine particles to be contained in the second microporous layer is preferably a particulate electrically conductive material or an electrically conductive material having a linear portion, which are the same as the electrically conductive fine particles preferably contained in the first microporous layer.

To achieve an improvement in the adhesion of the gas diffusion electrode to a catalyst layer, and a reduction in the contact resistance thereof with the catalyst layer, it is preferred that the electrically conductive fine particles and the catalyst layer have a large contact area. That is, since the second microporous layer is located on the outermost surface of the gas diffusion electrode and thus is in contact with the catalyst layer, and also since the hydrophobic polymer 2 contained in the second microporous layer covers the surfaces of the electrically conductive fine particles when melted, there is a risk that the above described improvement in the adhesion and reduction in the contact resistance may not be sufficiently achieved; and accordingly, the hydrophobic polymer 2 is preferably one which does not easily melt. This is to say that the hydrophobic polymer 2 to be contained in the second microporous layer is required to be of a type which does not easily melt during sintering. On the other hand, the hydrophobic polymer 1 has an effect of bonding the electrically conductive fine particles by melting; and at the same time, the melted hydrophobic polymer sufficiently covers the surfaces of the electrically conductive fine particles, as a result of which a high hydrophobicity can be imparted to the microporous layer. That is, it is important that the hydrophobic polymer 1 have a melting point lower than the melting point of the hydrophobic polymer 2. The hydrophobic polymer 2 is suitably a resin having a melting point of 330° C. or more and 400° C. or less. As such a material, PTFE is suitably used as the hydrophobic polymer 2. The melting point can be measured by observing an endothermic peak, using DSC.

The microporous layer will now be described in detail with reference to FIG. 2. As will be described later, a suitable method of producing the gas diffusion electrode according to the present invention includes, in the order mentioned below:

a step 1 of coating an ink 1, which is for forming the first microporous layer and which contains the hydrophobic polymer 1, on one surface of a conductive porous substrate;

a step 2 of coating an ink 2, which is for forming the second microporous layer and which contains the hydrophobic polymer 2; and a step 3 of sintering the resultant at a temperature higher than the melting point of the hydrophobic polymer 1 and lower than the melting point of the hydrophobic polymer 2.

A first microporous layer according to the present invention is a layer which is located on the outermost surface on one side of the microporous layer. The first microporous layer 201 has a thickness 203 of 9.9 µm or more, and more preferably 10 µm or more, in order to obtain an effect of preventing physical damage to an electrolyte membrane which occurs as a result of the coarse surface of the conductive porous substrate being transferred to the electrolyte membrane. It is noted, however, that the thickness of the first microporous layer is preferably 50 µm or less, because of the necessity to ensure the gas diffusivity even when the second microporous layer is laminated on top thereof.

A second microporous layer 200 according to the present invention is located on the outermost surface of the microporous layer on the side opposite to the first microporous layer, and is located on an outermost surface of the gas diffusion electrode. The gas diffusion electrode according to the present invention is used after providing the catalyst layer 102 on the surface of the second microporous layer. The role of the second microporous layer 200 is: to prevent the catalyst layer from penetrating into the conductive porous substrate having a coarse surface; to reduce the contact resistance with the catalyst layer; and to improve the adhesion to the catalyst layer.

In order to allow the second microporous layer to exhibit the effects of preventing the catalyst layer from penetrating into the conductive porous substrate and of reducing the contact resistance with the catalyst layer, the second microporous preferably has a thickness 202 of 0.1 µm or more and 10 µm or less. When the thickness of the second microporous layer is within this preferred range, the surface of the first microporous layer can be completely covered by the second microporous layer. Accordingly, there is no risk that the hydrophobic polymer 1 present in the first microporous layer exudes to the surface of the microporous layer; the adhesion between the catalyst layer and the microporous layer is less likely to be reduced; and at the same time, the gas diffusivity is less likely to be reduced. The thickness of the second microporous layer is more preferably 7 µm or less, and still more preferably 5 µm or less.

The thickness of the gas diffusion electrode or the conductive porous substrate can be measured using a micrometer or the like, while applying a load of 0.15 MPa to the substrate. Further, the thickness of the microporous layer can be determined by subtracting the thickness of the conductive porous substrate from the thickness of the gas diffusion electrode. In cases where the microporous layer has a two-layer configuration, and when the second microporous layer is coated on top of the first microporous layer coated on the conductive porous substrate, as shown in FIG. 2, the difference in thickness between the portion of the gas diffusion electrode where the second microporous layer has been coated and the portion thereof where the second microporous layer has not been coated, can be taken as the thickness of the second microporous layer. When forming the first microporous layer and the second microporous layer on the substrate, by coating, the thickness of each layer can be adjusted using the above described measuring method using a micrometer.

The gas diffusion electrode according to the present invention preferably has a gas diffusivity in the thickness direction of 30% or more, and more preferably 32% or more, in order to ensure fuel cell performance. A higher gas diffusivity in the thickness direction is more preferred. The upper limit value of the gas diffusivity is considered to be about 40%; this value is determined on the premise that, when the gas diffusion electrode is incorporated into a fuel cell, and if a pressure is applied to the interior of the cell due to too large a pore volume, a gas diffusivity not more than such an upper limit value allows for maintaining the structure of the gas diffusion electrode.

The gas diffusion electrode according to the present invention preferably has an electrical resistance in the thickness direction, under an applied pressure of 2.4 MPa, of 4.0 mΩcm$^2$ or less, in order to ensure the fuel cell performance. A lower electrical resistance in the thickness direction is more preferred. In the actual circumstances, however, it is not easy to achieve an electrical resistance under an applied pressure of 2.4 MPa of less than 0.5 mΩcm$^2$. Therefore, the lower limit thereof under an applied pressure of 2.4 MPa is about 0.5 mΩcm$^2$.

The coating of the ink 1 and ink 2 can be carried out using any of various types of coating apparatuses. Examples of coating methods which can be used include screen printing, rotary screen printing, spraying, intaglio printing, gravure printing, die coating, bar coating, blade coating, and comma coating. Among these, die coating is preferred, because it allows for quantifying the coating amount of the ink, regardless of the surface roughness of the conductive porous substrate. The coating methods exemplified above are presented merely for illustrative purposes, and the coating method to be used is not necessarily limited thereto.

After coating the ink 1 and the ink 2, the coated substrate is usually subjected to sintering, in order to allow the hydrophobic polymer contained in each ink to melt once and bond the electrically conductive fine particles with each other, as well as to allow the melted hydrophobic polymer to sufficiently cover the surfaces of the electrically conductive fine particles, thereby enabling to provide a high hydrophobicity.

The sintering is preferably carried out under a condition where the hydrophobic polymer 1 is sufficiently melted and the hydrophobic polymer 2 is not easily melted, namely, at a temperature higher than the melting point of the hydrophobic polymer 1 and lower than the melting point of the hydrophobic polymer 2. Specifically, the sintering is carried out at a temperature of 250° C. or more and 330° C. or less, and more preferably at a temperature of 280° C. or more and 320° C. or less.

The sintering may be carried out individually after the completion of each of the coating of the ink 1 and the coating of the ink 2; however, it is preferred that the sintering be carried out collectively after the completion of both the coating of the ink 1 and the coating of the ink 2.

In the case of forming a gas diffusion electrode consisting of the microporous layer, namely, in the case of producing the gas diffusion electrode according to the present invention which does not include a conductive porous substrate, a method can be used in which the ink 1 and the ink 2 are coated on a film, instead of the conductive porous substrate, to form the microporous layer by the above described method, and then the microporous layer is peeled off from the film, to obtain the gas diffusion electrode which does not include a conductive porous substrate.

The gas diffusion electrodes according to the present invention are assembled into a single cell by crimping each electrode on each of both sides of an electrolyte membrane which is provided with catalyst layers on both surfaces, such that the respective catalyst layers are in contact with the respective gas diffusion electrodes, followed by incorporating members such as bipolar plates, to be used as a fuel cell. At this time, it is preferred that the assembly is done such that the respective second microporous layers are in contact with the respective catalyst layers.

EXAMPLES

The present invention will now be specifically described by way of Examples. The materials, the method of producing a conductive porous substrate, and the method of evaluating the cell performance of a fuel cell, which are used in Examples, are shown below.
<Materials>
A: Conductive Porous Substrate A carbon paper having a thickness of 100 μm and a porosity of 85% was prepared in the manner described below.

Polyacrylonitrile-based carbon fibers "TORAYCA" (registered trademark) T300-6K (average monofilament diameter: 7 μm, number of monofilaments: 6,000 pieces) manufactured by Toray Industries, Inc. were cut into a length of 6 mm. The thus cut fibers are subjected to continuous paper making, along with pulp and water as a paper making medium. The resulting paper was further subjected to dipping in a 10% by mass aqueous solution of polyvinyl alcohol, and then drying. After the above described paper making process, the dried paper was wound in a roll, to obtain a continuous carbon fiber paper in which the areal weight of carbon short fibers is 15 g/m$^2$. The added amount of pulp corresponds to 40 parts by mass, and the deposited amount of polyvinyl alcohol corresponds to 20 parts by mass, with respect to 100 parts by mass of the carbon fiber paper obtained.

Flake graphite (average particle size: 5 μm, aspect ratio: 15), a phenol resin and methanol were mixed at a mass ratio of 2:3:25 to prepare a dispersion liquid. The carbon fiber paper obtained above was subjected to an impregnation process of continuously impregnating the paper with the thus prepared dispersion liquid such that the amount of the phenol resin impregnated was 78 parts by mass with respect to 100 parts by mass of the carbon short fibers, followed by drying at a temperature of 90° C. for three minutes. Thereafter, the resulting paper was wound in a roll, to obtain a resin-impregnated carbon fiber paper. As the phenol resin, a mixture obtained by mixing a resol type phenolic resin and a novolak type phenolic resin at a mass ratio of 1:1 was used. The phenol resin (the mixture of a resol type phenolic resin and a novolak type phenolic resin) had a carbonization yield of 43%.

To a press molding machine, hot platens were set so as to be in parallel with each other, and a spacer was disposed on the lower hot platen. Thereafter, while intermittently transporting the resin-impregnated carbon fiber paper vertically sandwiched between release papers, the carbon fiber paper was repeatedly subjected to pressing and releasing at a temperature of 170° C. and at a pressure of 0.8 MPa, to carry out a compression treatment. Thereafter, the resulting carbon fiber paper was wound in a roll.

The compression treated carbon fiber paper as a precursor fiber sheet was introduced into a heating furnace which was maintained under a nitrogen gas atmosphere and in which the highest temperature was set to 2400° C., and subjected to a carbonization process of baking the carbon fiber paper at a temperature rise rate of about 500° C./min (at a rate of 400° C./min up to 650° C., and at a rate of 550° C./min at a temperature above 650° C.), while continuously transporting the paper inside the heating furnace. Thereafter, the resulting paper was wound in a roll, to obtain a carbon paper. The thus obtained carbon paper had a density of 0.25 g/cm$^3$ and a porosity of 85%.

B: Electrically Conductive Fine Particles

"DENKA BLACK" (registered trademark) (manufactured by Denka Company Limited) was used C: Hydrophobic Polymer 1

A FEP dispersion "POLYFLON" (registered trademark) ND-110 (manufactured by Daikin Industries, Ltd.) was used. The contact angle with water of the hydrophobic polymer FEP, as measured by the method to be described later, was 150 degrees.

D: Hydrophobic Polymer 2

A PTFE dispersion "POLYFLON" (registered trademark) D-210C (manufactured by Daikin Industries, Ltd.) was used. The contact angle with water of the hydrophobic polymer PTFE, as measured by the method to be described later, was 150 degrees.

E: Surfactant

"TRITON" (registered trademark) X-114 (manufactured by Nacalai Tesque) was used.

F: Solvent

Purified water was used.

<Method of Measuring Melting Point of Hydrophobic Polymer>

The measurement of the melting point was carried out by observing an endothermic peak, using DSC. As a result, the melting point of FEP, which is the hydrophobic polymer contained in "POLYFLON" (registered trademark) ND-110, was 240° C.; and the melting point of PTFE, which is the hydrophobic polymer contained in "POLYFLON" (registered trademark) D-210C, was 340° C.

<Method of Measuring Thermal Decomposition Temperature of Hydrophobic Polymer>

The measurement of the thermal decomposition temperature was carried out by TG-DTA. As a result, the thermal decomposition temperature of FEP, which is the hydrophobic polymer contained in "POLYFLON" (registered trademark) ND-110, was 390° C.; and the thermal decomposition temperature of PTFE, which is the hydrophobic polymer contained in "POLYFLON" (registered trademark) D-210C, was also 390° C.

<Method of Measuring Contact Angle with Water of Hydrophobic Polymer>

A dispersion containing a hydrophobic polymer was dropped on a glass substrate, and subjected to a heat treatment at a temperature equal to or higher than the thermal decomposition temperature of a dispersant contained in the dispersion (with the proviso that the temperature is at least equal to or higher than 100° C., which is the evaporation temperature of water) and less than the thermal decomposition temperature of the hydrophobic polymer contained in the dispersion, so that the hydrophobic polymer alone remained on the glass substrate. Subsequently, pure water was dropped on top of the hydrophobic polymer remaining on the substrate, and the angle formed between the surface of the hydrophobic polymer and the surface of a water droplet was measured, to determine the contact angle with water of the hydrophobic polymer.

<Gas Diffusivity in Thickness Direction>

Using a water vapor/gas/permeation diffusion evaluation apparatus, MVDP-200C, manufactured by Seika Corporation, a gas whose diffusivity is to be measured is allowed to flow on one surface side (first side) of the gas diffusion electrode, and nitrogen gas is allowed to flow on the other surface side (second side) thereof. The pressure difference between the first side and the second side is controlled to around 0 Pa (0±3 Pa) (namely, controlled such that there is almost no flow of gases due to difference in pressure, and the movement of gases is initiated only by the diffusion of molecules). The gas concentration at equilibrium was measured by a gas densitometer on the second side, and the thus measured value (%) was taken as an index of the gas diffusivity in the thickness direction.

<Electrical Resistance in Thickness Direction>

The gas diffusion electrode is cut out in a size of 40 mm×40 mm, and sandwiched between upper and lower rigid metal electrodes plated with gold and having smooth surfaces. Then an average pressure of 2.4 MPa is applied thereto. The voltage of each of the upper and lower electrodes when a current of 1 A was applied thereto, in this state, was measured, and the electrical resistance per unit area calculated therefrom was taken as an index of the electrical resistance.

<Evaluation of Adhesion Between Catalyst Layer and Microporous Layer>

The gas diffusion electrode was layered with an electrolyte membrane-catalyst layer integrated product (composed of: an electrolyte membrane, "GORE-SELECT" (registered trademark) manufactured by W. L. Gore & Associates Company Limited; and two catalyst layers, "PRIMEA" (registered trademark) manufactured by W. L. Gore & Associates Company Limited, formed respectively on both surfaces of the electrolyte membrane), such that the microporous layer was in contact with the catalyst layer. After applying a pressure of 2 MPa to the resultant at 100° C. to carry out hot pressing, it was evaluated whether or not the gas diffusion electrode and the electrolyte membrane-catalyst layer integrated product were adhered with each other. If the position of the gas diffusion electrode did not change from the originally adhered position when the gas diffusion electrode and the integrated product were lifted up after the completion of hot pressing, it was determined that the gas diffusion electrode and the electrolyte membrane-catalyst layer integrated product were adhered with each other. If the position of the gas diffusion electrode did change, it was determined that the gas diffusion electrode and the integrated product were not adhered with each other. When the gas diffusion electrode and the integrated product were adhered with each other, it is indicated as "acceptable" in the Tables, and when they were not adhered with each other, it is indicated as "unacceptable" in the Tables.

<Evaluation of Fuel Cell Performance>

Two pieces of the gas diffusion electrodes were provided respectively on both sides of the electrolyte membrane-catalyst layer integrated product so as to sandwich the integrated product therebetween such that the respective microporous layers were in contact with the respective catalyst layers. The resultant was subjected to hot pressing by applying thereto a pressure of 2 MPa at 100° C., to prepare a membrane electrode assembly (MEA). The thus prepared membrane electrode assembly was incorporated into a single cell for use in a fuel cell, and the cell was operated to generate power at a cell temperature of 57° C., so as to achieve a fuel utilization efficiency of 70% and an air utilization efficiency of 40%, with hydrogen on the anode side and air on the cathode side both humidified to a dew point of 57° C. The output voltage (V) at a current density of 1.9 A/cm$^2$ was measured, and taken as an index of anti-flooding characteristics.

<Evaluation of Spring Property>

The gas diffusion electrode was cut out in a size of 40 mm×40 mm, and sandwiched between rigid metal bodies with smooth surfaces. Then the compression rate of the gas diffusion electrode under an average applied pressure of 2.0 MPa, with respect to the thickness of the gas diffusion electrode under an average applied pressure of 1.0 MPa, was determined, and taken as an index of the spring property.

Example 1

The carbon paper having a thickness of 100 μm and a porosity of 85% was subjected to a hydrophobic treatment, by dipping the carbon paper in a dip tank filled with a hydrophobic polymer dispersion which had been diluted with water to a polymer concentration of 2% by mass. The treated carbon paper was then dried at 100° C., to obtain a conductive porous substrate. As the hydrophobic polymer dispersion, the PTFE dispersion which had been diluted with water to a PTFE concentration of 2% by mass was used.

Next, a first microporous layer ink was coated on the resulting conductive porous substrate, using a die coater, followed by successively coating a second microporous layer ink using a die coater. The coated substrate was then dried at 100° C. to remove water, and further subjected to sintering at 300° C., to obtain a gas diffusion electrode.

The respective microporous layer inks were prepared as follows.

First Microporous Layer Ink:

A quantity of 7.1 parts by mass of "DENKA BLACK" (registered trademark), 3.9 parts by mass of the FEP dispersion, 14.2 parts by mass of "TRITON" (registered trademark) X-114, and 74.8 parts by mass of purified water were kneaded by a planetary mixer to prepare the ink. The resulting ink had a viscosity of 7.5 Pa·s.

Second Microporous Layer Ink:

A quantity of 7.1 parts by mass of "DENKA BLACK" (registered trademark), 3.9 parts by mass of the PTFE dispersion, 14.2 parts by mass of "TRITON" (registered trademark) X-114, and 74.8 parts by mass of purified water were kneaded by a planetary mixer to prepare the ink. The kneading by the planetary mixer was carried out for a period of time twice as long as the kneading time for the first microporous layer ink, to increase the degree of dispersion of the ink. The resulting ink had a viscosity of 1.1 Pa·s.

The coating of the first microporous layer ink was carried out so that the areal weight of the microporous layer after the sintering was adjusted to 16 g/m$^2$. The thickness of the first microporous layer at this time was 25 μm. Further, the coating of the second microporous layer ink was carried out so that the thickness of the second microporous layer was adjusted to 3 μm.

The measured results of: the thickness of the first microporous layer; the thickness of the second microporous layer; the gas diffusivity in the thickness direction; the electrical resistance in the thickness direction; the adhesion between the catalyst layer and the microporous layer; the fuel cell performance; and the spring property; of the thus prepared gas diffusion electrode are shown in Table 1.

Example 2

A gas diffusion electrode was obtained in the same manner as in Example 1, except that the sintering was carried out at a temperature of 280° C.

Example 3

A gas diffusion electrode was obtained in the same manner as in Example 1, except that the sintering was carried out at a temperature of 320° C.

Example 4

A gas diffusion electrode was obtained in the same manner as in Example 1, except that the areal weight of the first microporous layer after being sintered was adjusted to 32 g/m$^2$, and the thickness of the first microporous layer was adjusted to 50 μm.

Example 5

A gas diffusion electrode was obtained in the same manner as in Example 1, except that the thickness of the second microporous layer was adjusted to 10 μm.

Example 6

A first microporous layer ink was coated on a film using a die coater, followed by successively coating a second microporous layer ink using a die coater. The coated film was then dried at 100° C. to remove water, and further subjected to sintering at 300° C., followed by removing the film, to obtain a gas diffusion electrode.

The respective microporous layer inks were prepared as follows.

First Microporous Layer Ink:

A quantity of 7.1 parts by mass of "DENKA BLACK" (registered trademark), 3.9 parts by mass of the FEP dispersion, 14.2 parts by mass of "TRITON" (registered trademark) X-114, and 74.8 parts by mass of purified water were kneaded by a planetary mixer to prepare the ink. The resulting ink had a viscosity of 7.5 Pa·s.

Second Microporous Layer Ink:

A quantity of 7.1 parts by mass of "DENKA BLACK" (registered trademark), 3.9 parts by mass of the PTFE dispersion, 14.2 parts by mass of "TRITON" (registered trademark) X-114, and 74.8 parts by mass of purified water were kneaded by a planetary mixer to prepare the ink. The kneading by the planetary mixer was carried out for a period of time twice as long as the kneading time for the first microporous layer ink, to increase the degree of dispersion of the ink. The resulting ink had a viscosity of 1.1 Pa·s.

The coating of the first microporous layer ink was carried out so that the areal weight of the microporous layer after the sintering was adjusted to 16 g/m$^2$. The thickness of the first microporous layer at this time was 25 μm. Further, the coating of the second microporous layer ink was carried out so that the thickness of the second microporous layer was adjusted to 3 μm.

The gas diffusion electrode obtained in this Example had a low spring property. Other measured results are as shown in Table 1. The results revealed that, although having a low spring property, the gas diffusion electrode consisting of the microporous layer exhibits excellent performances in other properties evaluated.

Comparative Example 1

A gas diffusion electrode was obtained in the same manner as in Example 1, except that the FEP dispersion was used as the hydrophobic polymer dispersion to be used in the second microporous layer ink, and the sintering was carried out at a temperature of 200° C. The fuel cell performance of the thus obtained gas diffusion electrode was evaluated, and as a result, the output voltage was 0.27 V (operation temperature: 57° C., humidification temperature: 57° C., current density: 1.9 A/cm$^2$), as shown in Table 2, indicating slightly inferior anti-flooding characteristics. Other measured results are as shown in the Table.

Comparative Example 2

A gas diffusion electrode was obtained in the same manner as in Example 1, except that the FEP dispersion was used as the hydrophobic polymer dispersion to be used in the second microporous layer ink. In the gas diffusion electrode obtained in this Example, the microporous layer did not adhere to the catalyst layer. Other measured results are as shown in the Table.

Comparative Example 3

A gas diffusion electrode was obtained in the same manner as in Example 1, except that the PTFE dispersion was used as the hydrophobic polymer dispersion to be used in the first microporous layer ink. The fuel cell performance of the thus obtained gas diffusion electrode was evaluated, and as a result, the output voltage was 0.26 V (operation temperature: 57° C., humidification temperature: 57° C., current density: 1.9 A/cm$^2$), as shown in Table 1, indicating slightly inferior anti-flooding characteristics. Other measured results are as shown in the Table.

Comparative Example 4

A gas diffusion electrode was obtained in the same manner as in Example 1, except that the PTFE dispersion was used as the hydrophobic polymer dispersion to be used in the first microporous layer ink, and the FEP dispersion was used as the hydrophobic polymer dispersion to be used in the second microporous layer ink. In the gas diffusion electrode obtained in this Example, the microporous layer did not adhere to the catalyst layer. Other measured results are as shown in the Table.

Comparative Example 5

A gas diffusion electrode was obtained in the same manner as in Example 1, except that the PTFE dispersion was used as the hydrophobic polymer dispersion to be used in the first microporous layer ink, and the sintering was carried out at a temperature of 360° C. The fuel cell performance of the thus obtained gas diffusion electrode was evaluated, and as a result the output voltage was 0.28 V (operation temperature: 57° C., humidification temperature: 57° C., current density: 1.9 A/cm$^2$), as shown in Table 2, indicating slightly inferior anti-flooding characteristics. Further, in the gas diffusion electrode obtained in this Example, the microporous layer did not adhere to the catalyst layer. Other measured results are as shown in the Table.

TABLE 1

|  |  | units | Example 1 | Example 2 | Example 3 | Example 4 | Example 5 | Example 6 |
|---|---|---|---|---|---|---|---|---|
| Conductive Porous Substrate |  | — | present | present | present | present | present | absent |
| Hydrophbic polymer 1 | Type | — | FEP | FEP | FEP | FEP | FEP | FEP |
|  | Melting point | ° C. | 240 | 240 | 240 | 240 | 240 | 240 |
| Hydrophbic polymer 2 | Type | — | PTFE | PTFE | PTFE | PTFE | PTFE | PTFE |
|  | Melting point | ° C. | 340 | 340 | 340 | 340 | 340 | 340 |
| Anneal Temperature |  | ° C. | 300 | 280 | 320 | 300 | 300 | 300 |
| Thickness of the First Microporous Layer |  | [μm] | 25 | 25 | 25 | 50 | 25 | 25 |
| Thickness of the Second Microporous Layer |  | [μm] | 3 | 3 | 3 | 3 | 10 | 3 |
| Gas Diffusivity in Thickness Direction |  | [%] | 32 | 31 | 33 | 30 | 30 | 39 |
| Electric Resistance in Thickness Direction |  | [mΩcm$^2$] | 3.8 | 3.6 | 3.9 | 4.1 | 3.9 | 2.7 |
| Adhesion between Catalyst layer and Microporous layer |  | — | fair | fair | fair | fair | fair | fair |
| Fuel Cell Performance[Note] |  | [V] | 0.43 | 0.41 | 0.45 | 0.37 | 0.35 | 0.47 |
| Spring Property |  | [%] | 86 | 85 | 85 | 86 | 86 | 98 |

[Note] Output voltage at current density of 1.9 A/cm$^2$

TABLE 2

|  |  | units | Comparative Example 1 | Comparative Example 2 | Comparative Example 3 | Comparative Example 4 | Comparative Example 5 |
|---|---|---|---|---|---|---|---|
| Conductive Porous Substrate |  | — | present | present | present | present | present |
| Hydrophbic polymer 1 | Type | — | FEP | FEP | PTFE | PTFE | PTFE |
|  | Melting point | ° C. | 240 | 240 | 340 | 340 | 340 |

TABLE 2-continued

|  | units | Comparative Example 1 | Comparative Example 2 | Comparative Example 3 | Comparative Example 4 | Comparative Example 5 |
|---|---|---|---|---|---|---|
| Hydrophbic polymer 2   Type | — | FEP | FEP | PTFE | PTFE | FEP |
| Melting point | °C. | 240 | 240 | 340 | 340 | 240 |
| Anneal Temperature | °C. | 200 | 300 | 300 | 360 | 300 |
| Thickness of the First Microporous Layer | [μm] | 25 | 25 | 25 | 25 | 25 |
| Thickness of the Second Microporous Layer | [μm] | 3 | 3 | 3 | 3 | 3 |
| Gas Diffusivity in Thickness Direction | [%] | 30 | 32 | 29 | 32 | 30 |
| Electric Resistance in Thickness Direction | [mΩcm$^2$] | 3.9 | 4.5 | 3.8 | 4.2 | 4.3 |
| Adhesion between Catalyst layer and Microporous layer | — | fair | bad | fair | bad | bad |
| Fuel Cell Performance[Note] | [V] | 0.27 | 0.45 | 0.26 | 0.42 | 0.28 |
| Spring Property | [%] | 87 | 87 | 99 | 99 | 99 |

[Note]Output voltage at current density of 1.9 A/cm$^2$

INDUSTRIAL APPLICABILITY

The gas diffusion electrode according to the present invention includes a microporous layer which exhibits a high adhesion to a catalyst layer while ensuring a high water removal performance and a high electrical conductivity, and is capable of achieving both high performance and durability; therefore, the gas diffusion electrode can be preferably used in a polymer electrolyte fuel cell, which is used particularly as a power supply for a fuel cell vehicle or the like, among various types of fuel cells.

DESCRIPTION OF SYMBOLS 101 electrolyte membrane
102 catalyst layer
103 gas diffusion electrode
104 bipolar plate
2 conductive porous substrate
200 second microporous layer
201 first microporous layer
202 thickness of second microporous layer
203 thickness of first microporous layer

The invention claimed is:

1. A gas diffusion electrode comprising a conductive porous substrate and a microporous layer,
wherein the microporous layer comprises at least a first microporous layer and a second microporous layer;
wherein the first microporous layer contains electrically conductive fine particles and a first hydrophobic polymer and is located on a side of the microporous layer which is in contact with the conductive porous substrate;
wherein the second microporous layer contains electrically conductive fine particles and a second hydrophobic polymer and is located on a side of the microporous layer that is opposite to the side of the first microporous layer which is in contact with the conductive porous substrate, and the conductive porous substrate is located on an outermost surface of the gas diffusion electrode, on the side of the first microporous layer which is opposite to the second microporous layer; and
wherein the first hydrophobic polymer is a resin having a melting point lower than a melting point of the second hydrophobic polymer, and wherein the first microporous layer has a thickness of 9.9 um or more and 50 um or less.

2. The gas diffusion electrode according to claim 1, wherein the first hydrophobic polymer has a melting point of 200° C. or more and 250° C. or less, and the second hydrophobic polymer has a melting point of 330° C. or more and 400° C. or less.

3. The gas diffusion electrode according to claim 1, wherein the first hydrophobic polymer is a tetrafluoroethylene-hexafluoropropylene copolymer, and the second hydrophobic polymer is a polytetrafluoroethylene resin.

4. The gas diffusion electrode according to claim 1, wherein the second microporous layer has a thickness of 0.1 μm or more and 10 μm or less.

5. A method of producing the gas diffusion electrode according to claim 1, the method comprising, in the order mentioned below:
a step 1 of coating a first ink containing the first hydrophobic polymer on one surface of a film;
a step 2 of coating a second ink containing the second hydrophobic polymer on the side of the film on which the first ink was coated;
a step 3 of sintering the resultant at a temperature higher than the melting point of the first hydrophobic polymer and lower than the melting point of the second hydrophobic polymer; and
a step 4 of peeling off the microporous layer from the film.

6. A method of producing the gas diffusion electrode according to claim 1, the method comprising, in the order mentioned below:
a step 1 of coating a first ink containing the first hydrophobic polymer on one surface of a conductive porous substrate;
a step 2 of coating a second ink containing the second hydrophobic polymer on the side of the conductive porous substrate on which the first ink was coated; and
a step 3 of sintering the resultant at a temperature higher than the melting point of the first hydrophobic polymer and lower than the melting point of the second hydrophobic polymer.

* * * * *

UNITED STATES PATENT AND TRADEMARK OFFICE
CERTIFICATE OF CORRECTION

| | |
|---|---|
| PATENT NO. | : 11,283,082 B2 |
| APPLICATION NO. | : 16/462321 |
| DATED | : March 22, 2022 |
| INVENTOR(S) | : Hashimoto et al. |

It is certified that error appears in the above-identified patent and that said Letters Patent is hereby corrected as shown below:

In the Claims

At Claim 1, Column 18, Line 22:
"9.9 um or more and 50 um"
Should read:
-- 9.9 μm or more and 50 μm --

Signed and Sealed this
Fourteenth Day of June, 2022

Katherine Kelly Vidal
*Director of the United States Patent and Trademark Office*